United States Patent

[11] 3,557,758

| [72] | Inventor | Keith Malcolm Lack<br>Tipton, England |
|---|---|---|
| [21] | Appl. No. | 822,480 |
| [22] | Filed | May 7, 1969 |
| [45] | Patented | Jan. 26, 1971 |
| [73] | Assignee | Teledictor Limited<br>Tipton, England<br>a corporation of the United Kingdom of<br>Great Britain and Northern Ireland |
| [32] | Priority | May 9, 1968 |
| [33] | | Great Britain |
| [31] | | 21989/68 |

[54] ANIMAL IDENTIFICATION AND FEED CONTROL MEANS
9 Claims, 3 Drawing Figs.

[52] U.S. Cl............................................... 119/51,
119/51.12, 340/152, 340/258, 343/225
[51] Int. Cl............................................... A01k 05/02
[50] Field of Search.......................................... 119/51-
—63, 72—81, 51.12; 343/225X; 340/171, 196,
152X, 258X

[56] References Cited
UNITED STATES PATENTS

| 2,774,060 | 12/1956 | Thompson | 340/258 |
| 2,818,732 | 1/1958 | Bennett | 340/195 |
| 3,180,321 | 4/1965 | Aldinger | 119/51 |
| 3,260,034 | 7/1966 | Major | 119/106X |
| 3,465,724 | 9/1969 | Broadbent | 119/51 |

Primary Examiner—Aldrich F. Medbery
Attorney—Kenway, Jenney & Hildreth

ABSTRACT: The invention is concerned with the electronic identification of an animal such as a cow in a stall in order to enable the milk yield from the cow to be entered in a record as the milk yield of that particular cow and also to enable the appropriate predetermined quantity of feed concentrate required by that particular cow to be fed to it. A plurality of signals at discrete frequencies are transmitted from a transmission means to a receiving means in the vicinity of the stall and the cow to be identified is equipped with a tuned circuit or tuned circuits tuned to one or more of the said discrete frequencies so that the presence of this particular cow alters the transmitted signal strength at the corresponding frequencies and thus enables the cow to be identified.

ANIMAL IDENTIFICATION AND FEED CONTROL MEANS

DESCRIPTION OF THE INVENTION

The invention relates to identification arrangements and is particularly applicable to an identification system for identifying individual cows to be incorporated in an arrangement for controlling the milking of and individual dietary requirements of cows. A primary object of the present invention is to provide an apparatus for the electronic identification of each individual cow from a herd of cows.

According to the present invention there is provided an identification arrangement comprising means for transmitting a signal constituted by a plurality of discrete frequencies, means for receiving said signal, means for dividing the received signal into components corresponding to each of the discrete frequencies, all organized to cooperate in association with a plurality of animals freely movable as in a herd, each being provided with a passive resonant circuit or resonant circuits resonant at one or more of the discrete frequencies and means for detecting a change in the magnitude of each component of the received signal in response to the insertion of a unit to be identified between the transmitting means and the receiving means.

Preferably the means for receiving said signal is arranged in a null relationship with the transmitted signal such that in the absence of a unit to be identified the received signal strength is substantially zero, the presence of a passive resonant circuit in a unit to be identified disturbing the null relationship for its particular resonant frequency and thereby providing a substantial received signal strength at that frequency. An advantage of this latter arrangement is that it provides for simpler identification due to the fact that it is simpler to discriminate between zero signal strength and a substantial signal strength than it is to distinguish between two mutually differing but substantial signal strengths.

An embodiment of the present invention will now be described by way of example only with reference to the accompanying drawings in which.

Figure 1:
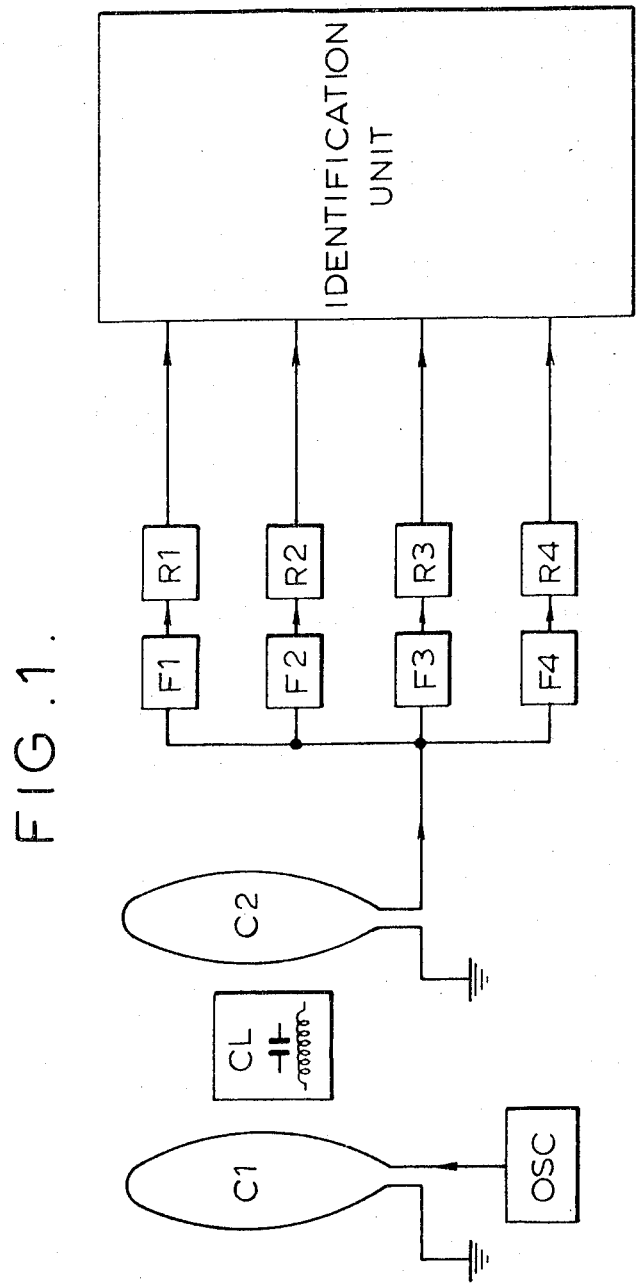
FIG. 1 is a block diagram of an identification arrangement according to the invention.

An oscillator means OSC supplies a signal constituted by a plurality of discrete frequencies to a transmitting coil C1 arranged in this example on one side of a manger near the position taken up by the head of a cow. Further details of such an oscillator means capable of producing a series of discrete frequencies are well known in the art and thus are not described herein in detail. The oscillator means OSC together with the coil CL constitutes means for generating a signal constituted by a plurality of discrete frequencies. A receiving coil C2 is arranged on the opposite side of the manger to receive transmitted signals from the transmitting coil C1.

The transmitting coil C1 should be such that it constitutes a highly directional transmitting device. This may simply be achieved by winding the coil on a ferrite rod. The two coils C1 and C2 should then be adjusted in position and direction so that the coil C2 lies in a null relationship with the signal transmitted from the coil C1. This may be achieved by arranging the two coils C1 and C2 substantially at right angles but in practice the most convenient way to set up the two coils is to use trial and error methods while the coil C1 is transmitting and the received signal at coil C2 is measured. Then by creating a disturbance in the field of the transmitting coil C1 the null relationship is destroyed and a substantial signal is received in the coil C2. If the disturbance in the field is created by the presence of one or more tuned circuits resonant at one or more of the discrete frequencies of the oscillator OSC, then the received signal in the coil C2 takes the form of substantial signals and the frequency or frequencies at which the resonant circuits are resonant whilst maintaining substantially zero received signal at other of the discrete frequencies.

Thus if each cow to be identified is equipped with a resonant circuit CL formed from a capacitive and inductive network and this resonant circuit is mounted on the head of the cow the presence of the cow in the manger with its head in the vicinity of the coils C1 and C2 (preferably between these two coils) then the coil C2 receives a signal of substantial strength at the frequency or frequencies at which the resonant circuit CL is resonant. The resonant circuit CL should of course be resonant at one or more of the discrete frequencies of the oscillator OSC. Further details of such resonant circuits are well known in the art and for this reason are not described in detail. The resonant circuit CL constitutes a means for changing the magnitude of one or more frequency components of said signal constituted by a plurality of discrete frequencies. As each cow is equipped with a resonant circuit or resonant circuits with a unique set of resonant frequencies (or frequency), it is thus possible to identify the cow in question from the information received.

The received signal from the coil C2 is fed to a series of band-pass filters F1, F2, F3 and F4 which are each arranged to pass one of the discrete frequencies. The individual frequency components of the received signal are rectified at the output of the filters in rectifiers R1, R2, R3 and R4 in order to provide a DC voltage level corresponding to the magnitude of the received signal component at the frequency concerned.

The magnitudes of these signals will be substantially zero at all frequencies at which the inserted resonant circuit CL is not resonant. On the other hand the signal will be substantial at those frequencies at which the resonant circuit CL is resonant. Thus the presence of substantial signals at any particular combination of rectifier outputs is a digital representation of the presence or absence of a resonant circuit at the corresponding frequency in the vicinity of the two coils C1 and C2. This information is fed to an identification unit which utilizes the digital information to identify a particular cow.

Figure 2:
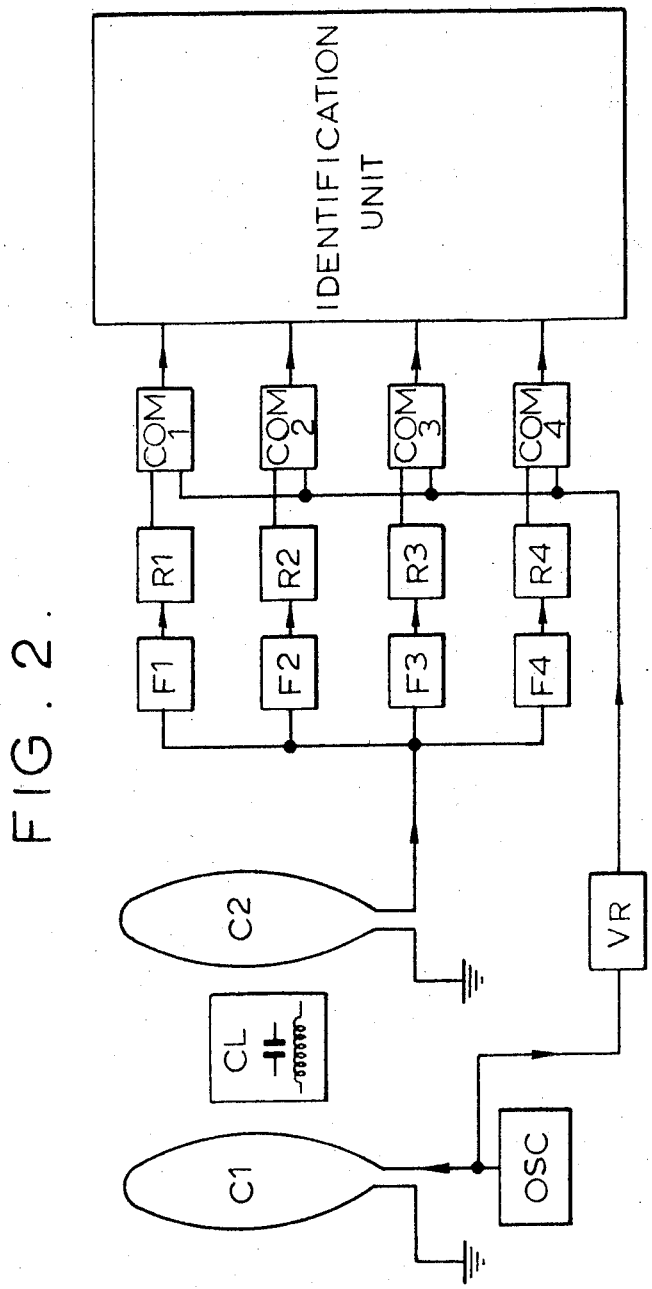
FIG. 2 shows an alternative form of identification arrangement.

FIG. 2 shows another but less preferable embodiment of the invention. In FIG. 2 the coils C1 and C2 are arranged substantially in the form of a loosely coupled transformer so that a signal transmitted from the coil C1 is received at a substantial signal level in the coil C2.

By varying the coupling between the two coils C1 and C2 for any one or more of the discrete frequencies at which the signal is transmitted, the magnitude of the component of the received signal at that frequency or those frequencies is correspondingly altered. Thus, if each cow to be identified is equipped with a resonant circuit CL formed from a capacitive and inductive network, and this resonant circuit is mounted on the head of the cow, then this resonant circuit alters the coupling between coils C1 and C2 and thus alters the magnitude of the component of the received signal at the corresponding frequency. By identifying the frequency or frequencies at which there is a change in the magnitude of a received signal, it is possible to identify the resonant frequency or frequencies of the resonant circuit or circuits attached to the cow. As each cow is equipped with a resonant circuit or resonant circuits with a unique set of resonant frequencies (or frequency) it is thus possible to identify the cow.

As in the previous embodiment the received signals from coil C2 are fed to band-pass filters and rectifiers in order to provide a DC level corresponding to the magnitude of the received signal component at the frequency concerned.

A DC reference voltage is derived for example from the output of the oscillator OSC in a reference voltage forming network VR and this reference voltage is fed to one input of a series of comparators COM1, COM2, COM3 and COM4. The other input of each comparator is supplied with the rectified DC output from the rectifiers R1, R2, R3 and R4 respectively. The comparators are such that an output signal is produced when the two input signals differ substantially. This occurs only when a resonant circuit which is resonant at the appropriate frequency is inserted between the coils C1 and C2. Thus the presence of signals at any particular combination of comparator outputs is a digital representation of the presence or absence of a resonant circuit resonant at the corresponding frequency between the two coils C1 and C2. As in the previous embodiment this information is fed to an identification unit which utilizes the digital information to identify a particular cow.

Either of the cow identification arrangements described above is intended for use in an arrangement for automatically recording the milk yield of each particular cow from a herd and also automatically supplying the cow in question with a particular quantity of feed concentrate determined for example from the previous milk yield of the cow.

Figure 3:
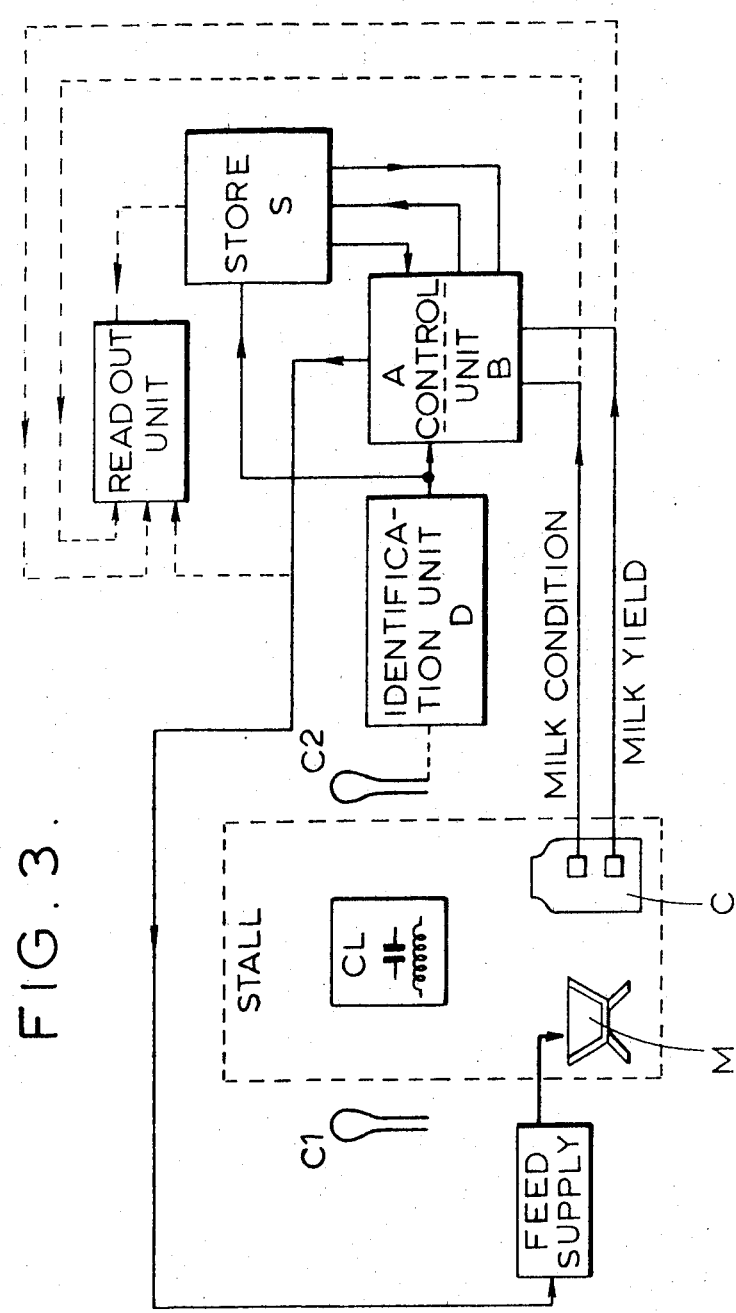
FIG. 3 shows the application of an identification arrangement to an arrangement for controlling the feed of a herd of cows.

An arrangement of this kind will now be described with reference to FIG. 3. FIG. 3 shows the identification arrangement of FIG. 1 or FIG. 2 in a very diagrammatic form by means of the coil C1, the identification unit CL on a cow, the coil C2 and the identification unit.

A magnetic store S, for example a magnetic core matrix store has written into it the appropriate information to identify each individual cow in conjunction with other information concerning that cow. This information includes a criterion by means of which the amount of a particular food concentrate to be fed to each individual cow can be determined. In a simple case, this information would be the average milk yield of the cow over a small number of recent milkings. In a more complicated case, the store could contain the individual milk yields from successive milkings over a substantial amount of time and also further information such as whether the cow has a record of diseases such as mastitis.

The information identifying a cow in the stall is fed from the identification unit D to the store S in order to cause the store to write in the appropriate information concerning the feeding requirement of the identified cow into a control unit. This control unit is in two parts. Part A is concerned with the control of the feed to the cow in response to information fed into the control unit. Part B is concerned with updating the information in the store S in order to enable an up to date assessment of the feeding requirements of the cow to be ascertained. Thus part A of the control unit is fed with information concerning the feed requirements of the cow and this in turn causes the appropriate amount of the specific food in question, for example a protein concentrate to be fed into the manger M for consumption by the cow.

While the cow is in the stall, it is both milked and fed. The milk is collected in a container C and the quantity of the milk in the container is measured by any suitable form of gauge. A signal indicating the milk yield is supplied to part B of the control unit. The previous average milk yield, possibly with other relevant information is also fed to section B of the control unit to be updated by the new milk yield. The updated information is then returned to the store for use on the next occasion when the same cow is milked.

The milk container may also be equipped with means for establishing the condition of the milk, for example for detecting the presence of mastitis. The relevant signal is also fed from a suitable measuring head in the milk container to part B of the control unit for recording in the store S.

The apparatus is also provided with means for giving a visual indication, preferably in written form, of the milk output and other factors relating to each individual cow. The information in this written form may be derived either from the store S, if this stores the actual milk yield and other relevant information, or alternatively it may be obtained directly from the information received in the identification unit D and in the measuring head of the milk yield unit. FIG. 3 indicates these two possible alternatives by dotted lines.

The installation has been described thus far in relation to a single feeding stall for the accommodation of a single cow. In practice, the apparatus would be used in a milking parlor having for example eight stalls arranged in two rows of four. The operator of the milking parlor then removes four cows from one row and installs four further cows and prepares them for milking while four previous cows are being milked in the other row. The operator thus alternates between the two rows.

In order to enable a cow to be identified in any of the stalls, each stall must be provided with a pair of coils C1 and C2. All eight signal receivers may be connected to a common identification unit which in turn is connected to the control unit and other equipment. Means are provided to ensure that an identification is taking place in only one stall at a time, otherwise there is a possibility of wrong identification.

I claim:

1. An arrangement for use in the identification of animals, comprising means associated with at least one feed stall for transmitting and receiving a signal constituted by a plurality of discrete frequencies, means for dividing the received signal into components corresponding to each of the discrete frequencies, passive resonant circuit means carried by certain animals that are freely movable as in a herd and being resonant at one or more of the discrete frequencies, and means for detecting a change of magnitude in each such component of the received signal in response to an approach to the stall of an animal to be identified.

2. An arrangement for use in the identification of animals as claimed in claim 1 in which the means for receiving said signal is arranged in a null relationship with the transmitted signal such that in the absence of any animal to be identified the received signal strength is substantially zero, in combination with passive resonant circuit means associated with certain of the animals to be identified disturbing the null relationship for its particular resonant frequency and thereby providing a substantial received signal strength at that frequency.

3. An arrangement for use in the identification of animals as claimed in claim 1 in which the means for transmitting a signal comprises a coil wound around a ferrite rod.

4. Apparatus for use in the identification of animals as claimed in claim 1 in which the means for transmitting a signal and the means for receiving said signal are together constituted by the primary and secondary windings of a loosely coupled transformer.

5. An arrangement for use in the identification of animals as claimed in claim 1 in which the magnitude of each component of the received signal is compared with a reference level derived from the signal supplied to the primary winding such that the presence of a passive resonant circuit resonant at a particular frequency is indicated by a difference between the reference signal and the received signal level associated with that frequency.

6. A cow identification and feed control arrangement incorporating an identification arrangement as claimed in claim 1 in combination with means for supplying a controlled quantity of feed concentrate to the identified cow in dependence upon a desired feed quantity selected for that cow.

7. An identification and feed arrangement for use in the controlled feeding of animals as claimed in claim 1 incorporating means for measuring and recording the milk yield of the cow identified in conjunction with information identifying that cow.

8. An identification arrangement for use in the controlled feeding of animals as defined in claim 1 wherein the transmitting and receiving means are mounted on opposite sides of a feed stall and the passive resonant circuits are located on the neck of each animal.

9. An arrangement for use in the identification of animals comprising means for generating a signal constituted by a plurality of discrete frequencies, a plurality of animals to be identified each associated with at least one passive circuit resonant at one or more of the discrete frequencies carried by certain animals that are freely movable as in a herd, means for changing the magnitude of one or more frequency components of said signal in response to the presence of an animal to be identified in the field of said signal, means for dividing the changed signal into components corresponding to each of the discrete frequencies and means for detecting a change of magnitude in each component of the changed signal in response to the presence of an animal to be identified in the field of said signal.